(12) United States Patent
Lo et al.

(10) Patent No.: US 10,944,935 B2
(45) Date of Patent: *Mar. 9, 2021

(54) AUDIO-VIDEO CONTROL SYSTEM

(71) Applicant: AMTRAN TECHNOLOGY CO., LTD, New Taipei (TW)

(72) Inventors: Kuo Chih Lo, New Taipei (TW); Tung Hsun Tsou, New Taipei (TW); Chin Cheng Liu, New Taipei (TW)

(73) Assignee: AMTRAN TECHNOLOGY CO., LTD, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,334

(22) Filed: Dec. 21, 2018

(65) Prior Publication Data

US 2019/0208155 A1 Jul. 4, 2019

(30) Foreign Application Priority Data

Dec. 29, 2017 (TW) .................................. 106146360

(51) Int. Cl.
| | |
|---|---|
| *H04N 5/60* | (2006.01) |
| *G06F 3/16* | (2006.01) |
| *H04N 17/04* | (2006.01) |
| *H04S 7/00* | (2006.01) |
| *H04N 21/00* | (2011.01) |
| *H04N 17/00* | (2006.01) |

(52) U.S. Cl.
CPC ............... *H04N 5/60* (2013.01); *G06F 3/165* (2013.01); *H04N 17/04* (2013.01); *H04N 21/00* (2013.01); *H04S 7/00* (2013.01); *H04N 2017/006* (2013.01)

(58) Field of Classification Search
CPC .......... G06F 3/165; H04N 5/60; H04N 17/04; H04N 21/00; H04S 7/00
USPC ................... 704/275; 455/412.2; 381/56, 95; 713/186
See application file for complete search history.

(56) References Cited

U.S. PATENT DOCUMENTS

| | | | |
|---|---|---|---|
| 9,689,960 B1* | 6/2017 | Barton | G01S 3/8083 |
| 10,446,165 B2* | 10/2019 | Giacobello | G10L 21/0208 |
| 2003/0046557 A1* | 3/2003 | Miller | G06F 21/32 |
| | | | 713/186 |
| 2006/0147055 A1* | 7/2006 | Ise | H04R 3/02 |
| | | | 381/95 |
| 2008/0091434 A1* | 4/2008 | Rodriguez | G06F 17/2735 |
| | | | 704/275 |

(Continued)

*Primary Examiner* — Paulos M Natnael
*Assistant Examiner* — Sean N. Haiem
(74) *Attorney, Agent, or Firm* — Maschoff Brennan

(57) ABSTRACT

An audio-video control system has a first AV displayer, a second AV displayer, a router and a processor. The first AV displayer is located in a first area and communicatively connected to a first device, and receives a first audio signal in the first area. The second AV displayer is located in a second area and communicatively connected to a second device, and receives a second audio signal in the second area. The router is communicatively connected to the first AV displayer and the second AV displayer. The processor processes the first audio signal to generate a first control signal and processes the second audio signal to generate a second control signal. The processor sends the first control signal to the first device via the router and the first AV displayer and sends the second control signal to the second device via the router and the second AV displayer.

8 Claims, 3 Drawing Sheets

(56) References Cited

U.S. PATENT DOCUMENTS

| | | | |
|---|---|---|---|
| 2009/0016540 A1* | 1/2009 | Heningsen Nielsen | ..................... H03G 1/02 381/56 |
| 2015/0003622 A1* | 1/2015 | Lee | ....................... H04R 1/1033 381/71.6 |
| 2015/0172878 A1* | 6/2015 | Luna | ....................... H04W 4/12 455/412.2 |
| 2018/0018967 A1* | 1/2018 | Lang | ....................... G06F 3/165 |
| 2018/0321905 A1* | 11/2018 | Fountaine | ................ G06F 3/165 |
| 2019/0096419 A1* | 3/2019 | Giacobello | ............ H04M 9/082 |

* cited by examiner

AUDIO-VIDEO CONTROL SYSTEM

CROSS-REFERENCE TO RELATED APPLICATIONS

This non-provisional application claims priority under 35 U.S.C. § 119(a) on Patent Application No(s). 106146360 filed in Taiwan R.O.C. on 29 Dec. 2017 the entire contents of which are hereby incorporated by reference.

BACKGROUND

1. Technical Field

The disclosure relates to an audio-video control system, more particularly to the audio-video control system with a function of internet of things.

2. Related Art

Nowadays, most of the present smart home appliance manufacturers provide a smart home appliance control host. Although a plurality of the smart home appliances may be controlled by the smart home appliance control host through the internet of things, the user often needs to install many extra sensors such as the audio and video sensors. As a result, the extra installation not only costs the user to pay more, but also affects the layout of the home environment.

Additionally, when the conventional sensors are installed, the corresponding parameters have to be set particularly so as to make the smart home appliance control host be able to recognize where the sensors are located, so as to provide the correct control to the appliance. However, the setting is more complex as there are more sensors.

SUMMARY

According to one or more embodiment of this disclosure, an audio-video control system is adapted for controlling a first device in a first area and a second device in a second area. The system comprising a first audio-video player, a second audio-video player, a router and a processor. The first audio-video player is disposed in the first area and communicatively connected to the first device. The first audio-video player comprises a first audio sensor for receiving a first audio signal in the first area. The second audio-video player is disposed in the second area and communicatively connected to the second device. The second audio-video player comprises a second audio sensor for receiving a second audio signal in the second area. The router is communicatively connected to the first audio-video player and the second audio-video player. The processor is communicatively connected to the first audio-video player and the second audio-video player through the router. The processor is adapted for processing the first audio signal for to generating a first control signal, and for the processor processing the second audio signal to for generating a second control signal. The processor sends the first control signal to the first device through the router and the first audio-video player. The processor sends the second control signal to the second device through the router and the second audio-video player.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
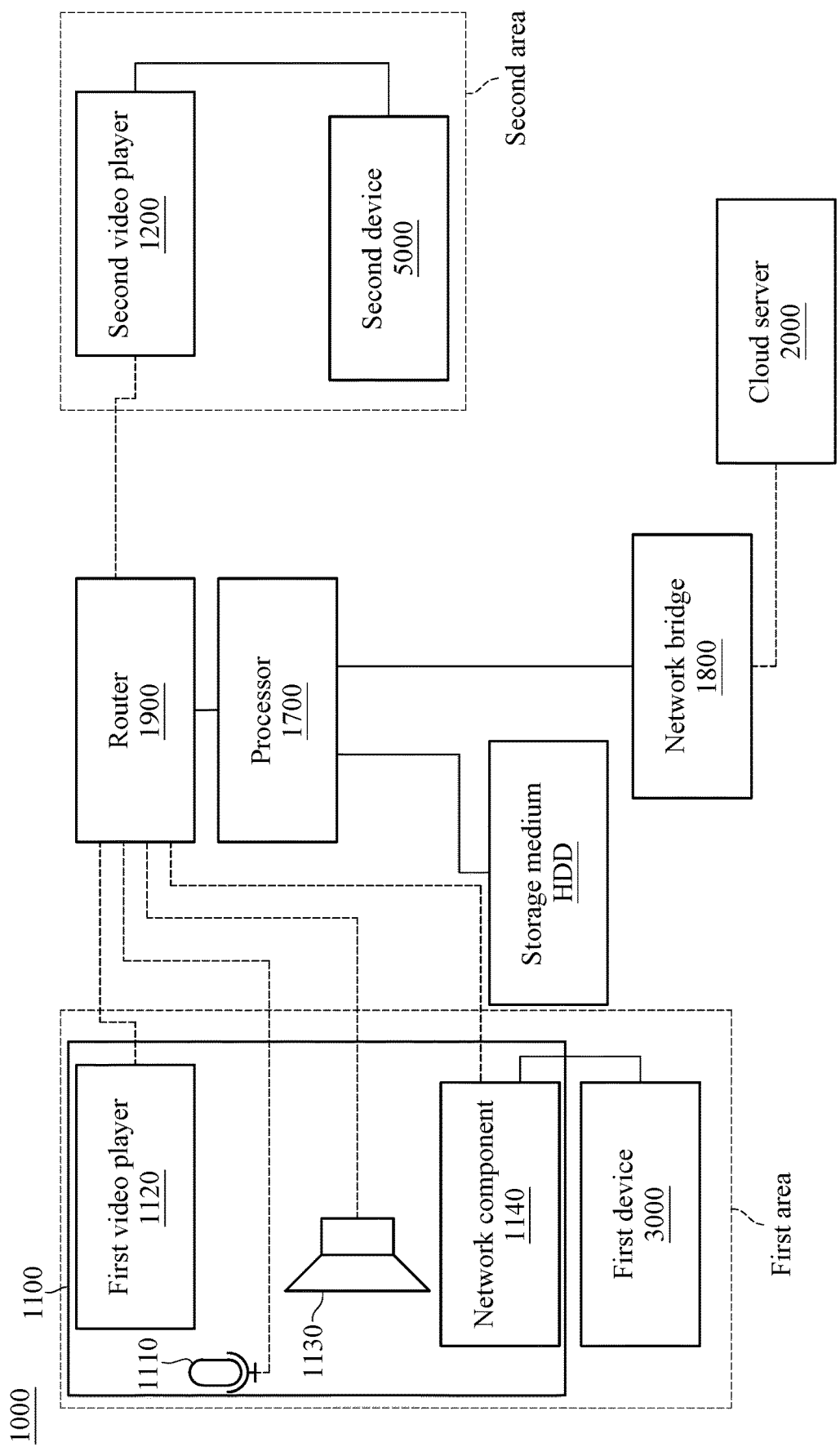
FIG. 1 is the functional block diagram of the audio-video control system according to one embodiment in this disclosure.

Please refer to FIG. 1, which is the functional block diagram of the audio-video control system according to one embodiment in this disclosure. As FIG. 1 shows, the audio-video control system 1000 in one embodiment of this disclosure comprises a first audio-video player 1100, a second audio-video player 1200, a processor 1700, a network bridge 1800 and a router 1900.

For example, the first audio-video player 1100 and the second audio-video player 1200 may be a television. The first audio-video player 1100 is communicatively connected to the first device 3000, and the second audio-video player 1200 is communicatively connected to the second device 5000. In addition, the first audio-video player 1100 may be disposed in the first area such as the master bedroom, and the second audio-video player 1200 may be disposed in the second area such as the living room.

The first audio-video player 1100 may comprise a router/hub/access point (AP) (not shown in the figure), so that the first device 3000 may use the first audio-video player 1100 as a base station or a router. And the first device 3000 is communicatively connected to the router 1900 through the first audio-video player 1100 or the network component thereof. Hence, the communication connection between the first audio-video player 1100 and the processor 1700 is implemented.

Similar to the first audio-video player 1100, the second audio-video player 1200 may also comprise a router/hub/access point (AP) (not shown in the figure), so that the second device 5000 may use the second audio-video player 1200 as the base station or the router. And the second device 5000 is communicatively connected to the router 1900 through the second audio-video player 1200 or the network component thereof. Therefore, the communication connection between the second audio-video player 1200 and the processor 1700 is implemented.

The description hereinafter is an example of the first audio-video player 1100, and since the second audio-video player 1200 has the similar structure and function, the corresponding descriptions are not illustrated herein. The first audio-video player 1100 comprises a first audio sensor 1110, a first video player 1120, a first audio player 1130 and a network component 1140. The first audio sensor 1110 is adapted for receiving a first audio signal in a first area. The first video player 1120 and the first audio player 1130 are able to play audio signals and video signals respectively at the same time, and the function such as the audio-video player of the television may be implemented. Also, the network component 1140 is used as a router to communicatively connect to the first device 3000. Specifically, for example, the first audio sensor 1110 may have a microphone and an analog digital converter (not shown in the figures). The microphone is able to receive the first audio signal in the audio form from the first area, and the microphone transforms the first audio signal in the audio form to the first audio signal in the analog form. In addition, the analog digital converter is able to transform the first audio signal in the analog form to the first audio signal in the digital form The processor 1700 is connected to the network through the network bridge 1800, and is electrically connected to the first audio-video player 1100 and the second audio-video player 1200 through the router 1900. Specifically, the processor 1700 controls the first device 3000 in the LAN (local area network) through the first audio-video player 1100, and controls the second device 5000 in the LAN (local area network) through the second audio-video player 1200.

For example, when the first audio sensor 1110 of the first audio-video player 1100 receives the first audio signal in the first area, the processor 1700 is able to analyze this first audio signal. Then the processor 1700 determines or recognizes whether the source of this first audio signal is corresponding to a first account according to the analyzed result. When the source of the first audio signal is corresponding to the first account, the processor 1700 is able to process the first audio signal for obtaining the corresponding control signal, and the processor 1700 controls the first device 3000 by the corresponding control signal so as to make the first device 3000 perform the corresponding function. Aforementioned source of the first audio signal is associated with the object generating the first audio signal. Specifically, the processor 1700 analyzes the characteristic of the first audio signal and then compares with the acoustic fingerprinting of the first account. The processor 1700 processes the first audio signal for obtaining the control signal when the processor 1700 determines that the characteristic of the first audio signal is matched with the acoustic fingerprinting of the first account. In an embodiment, when the processor 1700 determines that the characteristic of the first audio signal is matched with the acoustic fingerprinting of the first account and that the first audio signal is adapted for turning on or turning off the first device 3000, the processor 1700 is able to turn on or turn off the first device 3000 correspondingly. In another embodiment, when the processor 1700 determines that the characteristic of the first audio signal is matched with the acoustic fingerprinting of the first account and that the first audio signal is adapted for controlling the first device 3000 to perform a specific function, the processor 1700 is able to transmit the control signal correspondingly in order to make the first device 3000 perform abovementioned specific function. Furthermore, when the first device 3000 is an illuminating device with the function of changeable brightness, abovementioned specific function may be the brightness change of this illuminating device. Moreover, when the first device 3000 is an air condition device with the function of several changeable parameters, abovementioned specific function may be the temperature, the air volume or the shutdown time, etc.

In an embodiment, the user is able to set the audio-video control system 1000 in a training mode through the first audio-video player 1100. In the training mode, the processor 1700 is able to compare the characteristic of the first audio signal with the acoustic fingerprinting of the first account. When the processor 1700 determines that the characteristic of the first audio signal is matched with acoustic fingerprinting of the first account, the processor 1700 may record the operations on the first device 3000 by the source of the first audio signal in a following period of time. Therefore, the first instruction set of the first account and the first area is built in abovementioned way. In the training mode, when the processor 1700 determines that the characteristic of the first audio signal is not matched with the acoustic fingerprinting of the first account, the processor 1700 transmits a prompt notice to add a new account for the source of first audio signal.

Similarly, when the user sets the audio-video control system 1000 as the training mode through the second audio-video player 1200, when the processor 1700 determines that the characteristic of the second audio signal is matched with the acoustic fingerprinting of the first account in the second area, the processor 1700 may record the operation the operations on the second device 5000 by the user in a following period of time so as to build the corresponding second instruction set for the first account in the second area. On the other hand, when the processor 1700 determines that the characteristic of the second audio signal in the second area is not matched with the acoustic fingerprinting of the second account, the processor 1700 transmits a prompt notice to add a new account for the source of the second audio signal. Hence, the user is able to build N accounts corresponding to M areas, and there are N*M instruction sets totally, wherein N and M are positive integers.

Figure 2:
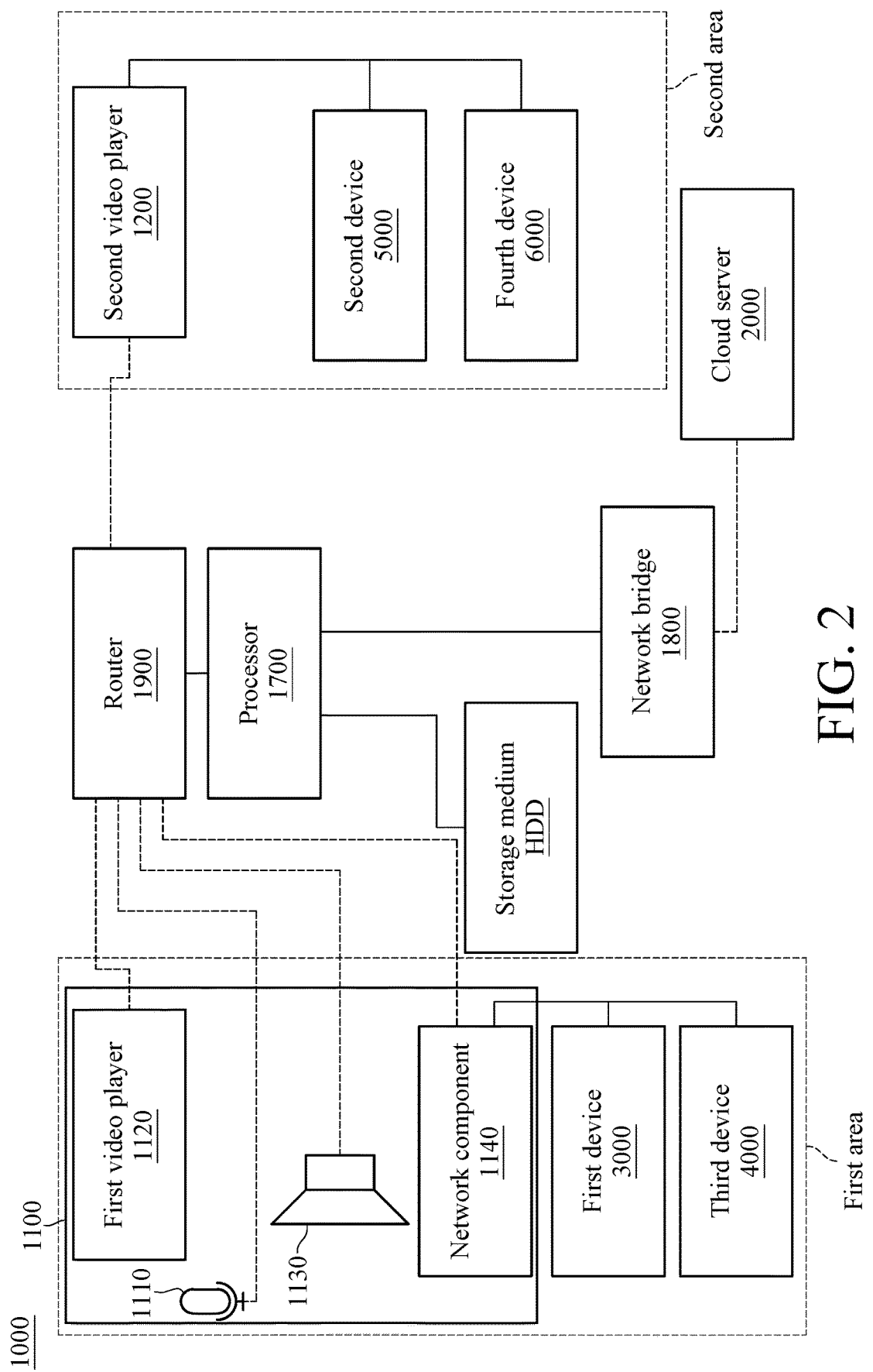
FIG. 2 is the functional block diagram of the audio-video control system according to one embodiment in this disclosure.

In another embodiment, the processor 1700 further stores the time information in a storage medium HDD. Also, when the processor 1700 processes the first audio signal according to the first instruction set for obtaining the control signal, the processor 1700 is further able to consult with the time information. That is, the processor 1700 in this disclosure not only generates aforementioned control instruction according to the first instruction set, but also generates the control instruction according to the time information. As a result, the control instruction may accord with the corresponding habit or the likes. In an embodiment, aforementioned time information may send the first audio signal in a period during a predetermined period (such as a week or a month) so as to make the first device 3000 perform the frequency of specific function. For example, the same user often turns off the air condition and turns on the light in the master bedroom (first area) in the morning, and often turns on the air condition and turns off the light in the master bedroom at the night. Hence, the first instruction set is divided into a first sub-instruction set (corresponding to morning) and a second sub-instruction set (corresponding to night), and it may speed up the analysis and feedback time of the instruction. Although in aforementioned embodiment, the electronic device connected to the first audio-video player only includes the first device 3000 in the first area, this disclosure is not limited by this feature. FIG. 2 is the functional block diagram of the audio-video control system according to one embodiment in this disclosure. Comparison with FIG. 1, the main difference is that there is a third device 4000 connected to the first audio-video player 1100 through the network component 1140 in the first area. The processor 1700 is able to send corresponding control signal according to the first audio signal so as to control the third device 4000. Furthermore, there is a fourth device 6000 in the first area in FIG. 2, and since other parts are similar to the audio-video control system 1000 in FIG. 1, the corresponding descriptions are not illustrated again herein. Specifically, a plurality of electronic devices is able to communicatively connect to the processor 1700 through the first audio-video player 1100. The processor 1700 is able to analyze the first audio signal, and is able to perform corresponding operation with aforementioned electronic devices according to the analytical result.

Please refer to FIG. 1, the first instruction set of the first account may be saved in the cloud server 2000. By the network bridge 1800, the processor 1700 communicates to the cloud server 2000 through the internet. The processor 1700 is able to send the first audio signal to the cloud server 2000, and the cloud server 2000 processes the program such as the analysis and processing the first audio signal, etc. Hence, the processor 1700 generates the control instruction according to the results of the analysis and processing, and the processor 1700 further obtains the control signal from the cloud server 2000 by the network bridge 1800. Specifically, the first instruction set is saved in the local storage medium HDD in above embodiment, so necessary time for obtaining the control signal by processing the first audio signal could be shorter. However, the complexity and/or the amount of the instructions are limited by the computing power of the processor 1700 and the storage capacity of the storage medium HDD. In this embodiment, the first instruction set is saved in the cloud server 2000. In other words, the program of analysis and processing the first audio signal for obtaining the control signal is performed by the cloud server 2000. Therefore, a more complicated method "the artificial intelligence system based on the neural network architecture" (performed in the cloud server) may be performed, and more complex and more amount of the instructions may be processed. However, the time spent for obtaining the control signal by processing the first audio signal is longer than above embodiment.

In another embodiment, the user may watch the television and send the instruction by voice in the first area (in the master bedroom). In this condition, the voice from the first audio-video player 1100 may be hard to be processed for the first audio signal.

In order to avoid the interference made by the voice from the first audio-video player 1100, and aforementioned interference may affect the recording quality of the first audio sensor 1100. As a result, in another embodiment in this disclosure, the processor 1700 is able to obtain the audio signal playing currently (obtaining from the first audio-video player 1100 directly, rather than obtaining from the recording of the first audio sensor 1110) from the first audio-video player 1100. Also, the processor 1700 performs the noise suppression process for the first audio signal according the audio playing signal recorded by the first audio sensor 1110, and obtains the third audio signal. Then, the processor 1700 processes the third audio signal so as to obtain the control signal, wherein the processor 1700 obtains the audio playing signal in the electronic signal form the first audio-video player 1100 through the LAN (local area network) directly.

Figure 3:
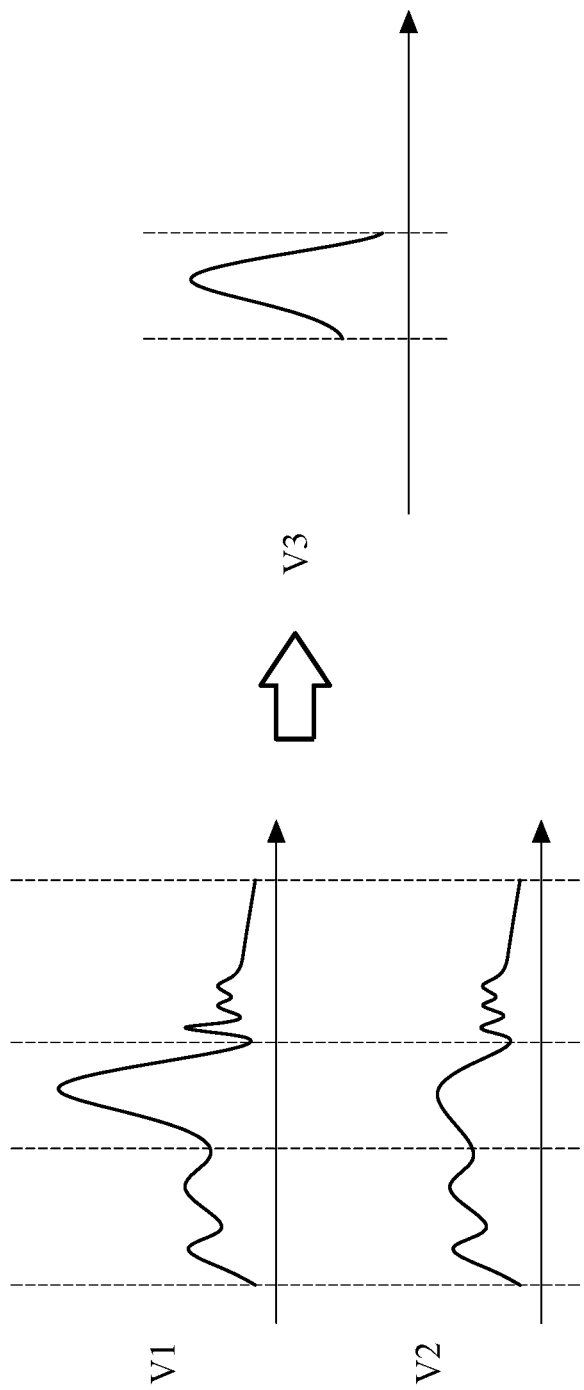
FIG. 3 is the schematic diagram of the noise suppression process according to one embodiment in this disclosure.

Specifically, please refer to FIG. 3, and FIG. 3 is the schematic diagram of the noise suppression process according to one embodiment in this disclosure. In FIG. 3, the first audio signal V1 is the audio playing signal received by the first audio sensor 1110. The audio signal may include the voice generated from the source of the first audio signal (such as corresponding user of aforementioned first account), and the audio signal actually played by the first audio-video player 1100. Also, the audio signal V2 is the audio playing signal (for example, the audio stream from the audio and video channel system) obtained from the first audio-video player 1100 directly by the processor 1700, rather than the processed signal recorded by the first audio sensor 1110. As FIG. 3 shows, the third audio signal V3 is obtained by deducting the audio playing signal V2 from the first audio signal V1. Since the audio playing signal V2 is sourced from the first audio-video player 1100, through removing the voice played by the first audio-video player 1100 from the first audio signal V1 directly by the processor, the remain signal should be the voice from the user in the first area.

Sine there is a time difference from the first audio player 1130 of the first audio-video player 1100 playing the voice to the first audio sensor 1110 receiving the voice, in order to cancel the interference made by the voice played by the first audio-video player 1100 accurately, in an embodiment, the processor 1700 is able to obtain the audio test signal which the first audio-video player 1100 want to play in the training mode directly, and the audio test signal actually played by the first audio-video player 1100 is obtained by the first audio sensor 1110. Then, after the processor 1700 analyzes and processes the directly obtained audio test signal, and receives the audio test signal, a delay time difference T of two aforementioned audio test signals may be obtained. Therefore, the third audio signal without the delay time difference T is obtained by deducting the audio playing signal without the delay from the first audio signal.

Additionally, the audio signal played by the first audio-video player 1100 often includes the audio information and loudness information, and the processor 1700 is not able to know the relation between the actual loudness information and the actual signal strength of the audio signal received by the first audio sensor 1110; also, the loudness is different after the voice actually played by the first audio-video player 1100 is received by the first audio sensor 1110. For these reasons, in another embodiment, the processor 1700 further builds a loudness adjustment model according to the loudness information of the direct obtained audio test signal and the audio test signal received by the first audio sensor 1110. When the processor 1700 performs the noise suppression process, the processor 1700 calibrates the first audio signal obtained by the first audio sensor 1110 based on the loudness adjustment model at first, then the processor 1700 deducts the calibrated audio playing signal from the first audio signal so as to further obtain the third audio signal. Aforementioned embodiments may be implemented respectively or be implemented together with each other, it is not limited in this disclosure. Furthermore, aforementioned embodiments may be implemented for the second audio-video player 1200 in the same method.

Specifically, in the training mode, the processor 1700 controls the first audio-video player 1100 to use the audio test signal output from the first audio player 1130, wherein the audio test signal may be a voice with a volume setting of 20. The processor 1700 may obtain the corresponding audio correction signal (for example, 50 dB) from the first audio sensor 1110. Also, the processor 1700 controls the first audio-video player 1100 to output the audio test signal, wherein the audio test signal may be the voice with a volume setting of 15. The processor 1700 may obtain the corresponding audio correction signal (for example, 40 dB) from the first audio sensor 1110. Repeating above steps many times, by a plurality of audio test signals and a plurality of corresponding audio correction signals, the processor 1700 builds a loudness adjustment model for describing the relation between the audio playing signal (or the audio test signal in the training mode) output from the first audio player 1130 of the first audio-video player 1100, and the corresponding components in the first audio signal received from the first audio sensor 1110.

In an embodiment, when the processor 1700 receives the first audio signal and the processor 1700 is not in the training mode, the processor 1700 confirms whether the first audio-video player 1100 plays a program currently. When the first audio-video player 1100 plays the program currently, the processor 1700 obtains the current audio playing signal from the first audio-video player 1100, and after the processor 1700 processes the audio playing signal by the loudness adjustment model for obtaining the corresponding waveforms and loudness in the first audio signal, and according to the time difference obtained previously also, the processor 1700 removes the components corresponding to the audio playing signal from the first audio signal for obtaining the second audio signal. In other words, in this embodiment, the audio playing signal processed through the loudness adjustment model is removed from the first audio signal.

In another embodiment, when the processor 1700 receives the first audio signal and the processor 1700 is not in the training mode, the processor 1700 confirms whether the first audio-video player 1100 plays a program currently. When the first audio-video player 1100 plays the program currently, based on the relation described by the loudness adjustment model, the processor 1700 transforms the information of the first audio signal to the same form of the audio playing signal. Also, according to the obtained time difference previously, the processor 1700 removes the audio playing signal from the first audio signal which has been processed by the loudness calibration for obtaining the second audio signal. In other words, in this embodiment, it processes the first audio signal by the loudness adjustment model in order to remove the audio playing signal.

In some conditions, the area where the audio-video control system 1000 is located, there may be a plurality of people there at the same time. Hence, in an embodiment, when the first audio sensor 1110 receives the first audio signal and a third audio signal simultaneously, the processor 1700 further determines whether the third audio signal is corresponding to a second account. When the third audio signal is not corresponding to the second account, the processor 1700 only processes the first audio signal for obtaining the control signal. In other words, when the user used the audio-video control system 1000 has a visitor at home, since the visitor does not have an account set in the audio-video control system 1000, the voice from the visitor is ignored.

In an embodiment in this disclosure, the storage medium HDD not only saves a plurality of instruction set associated with the first account (named the first account instruction set hereinafter), but also saves the second account instruction set; wherein the first instruction set is associated with the first account, and the second instruction set is associated with the second account. When the processor 1700 determines the third audio signal is corresponding to the second account, the processor 1700 determines whether the first account is prior to the second account so as to determine to use the first account instruction set or the second account instruction set to generate the control signal. Specifically, if there are a father (the first account), a mother (the second account), a sister (the third account) and a brother (the fourth account) in a family, wherein the priority is the second account, the first account, the third account and the fourth account in order. Among the people in the family, when they watch the television, the father often prefers the common light, the mother often prefers the light with warm color, the sister often prefers to turn off all the lights and the brother often prefers to turn on the projection lamp above the television (the first audio-video player 1100). If the father and the mother send the instruction for switching the channel to the movie channel in the master bedroom (the first area) at the same time, the processor 1700 not only controls the first audio-video player 1100 to switch the channel to the movie channel, but also controls the third device 4000 (light) to switch to the light with warm color. Similarly, if the sister and the brother send the instruction for switching the channel to the movie channel in the living room (the second area) at the same time, the processor 1700 not only controls the second audio-video player 1200 to switch the channel to the movie channel, but also controls the fourth device 6000 (light) to turn off all the lights.

The first device to the fourth device in each aforementioned embodiment are described as the example like light and air condition, but the people with ordinary skill in the related art is able to replace the example like light and air condition to other smart home appliances according to the applications in practice, such as an electric stove, a microwave oven, an ice machine or a monitor, etc. The feature is not limited in this disclosure.

In some embodiments, based on the same concepts, it is able to capture the sensing signal sensed by the temperature sensor and/or the humidity sensor of the air condition to the processor 1700. In other embodiments, a mobile device of a user is often connected to the LAN (local area network) the same as the processor 1700, so the sensing signal of the ambient light sensor of the mobile device is able to use as a light sensor in specific area.

As a result, by integrating the audio sensor with the audio-video player, it may be avoided to configure a plurality of the surplus audio sensors when the user sets the smart home appliances system. Furthermore, by integrating the audio sensor with the audio-video player, it is able to be avoided to configure a plurality of the surplus audio sensors when the user sets the smart home appliances system.

The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An audio-video control system adapted for controlling a first device in a first area and a second device in a second area, the system comprising:
   a first audio-video player disposed in the first area and communicatively connected to the first device, the first audio-video player having a first audio sensor for receiving a first audio signal in the first area;
   a second audio-video player disposed in the second area and communicatively connected to the second device, the second audio-video player having a second audio sensor for receiving a second audio signal in the second area;
   a router communicatively connected to the first audio-video player and the second audio-video player;
   a processor communicatively connected to the first audio-video player and the second audio-video player through the router, the processor adapted for processing the first audio signal to generate a first control signal and for processing the second audio signal to generate a second control signal, the processor sending the first control signal to the first device through the router and the first audio-video player, and the processor sending the second control signal to the second device through the router and the second audio-video player; and a plurality of first sensors disposed in the first area, the first sensors adapted for collecting a plurality of first sensing signals;

wherein the processor generates the first control signal according to the first sensing signals and the first audio signal, the processor further obtains an audio playing signal from the first device directly as an electrical or wireless signal that is not an audio signal received by the first audio sensor, and the processor directly subtracts the audio playing signal played by the first device from the first audio signal to obtain a third audio signal for performing a noise suppression process, and the processor processes the third audio signal for obtaining the control signal, the processor further determines whether a third audio signal is corresponding to a second account when the first audio sensor simultaneously receives the first audio signal and the third audio signal, and the processor only processes the first audio signal for obtaining the control signal when the third audio signal is not corresponding to the second account, and the first audio signal corresponds to a first account, the audio-video control system further comprises a storage medium storing a first account instruction set and a second account instruction set, wherein the first account instruction set is associated with the first account, and the second account instruction set is associated with the second account, and the processor determines whether a priority of the first account is higher than a priority of the second account so as to determine which one of the first account instruction set and the second account instruction set is used to generate the control signal when the third audio signal is corresponding to the second account.

2. The audio-video control system according to claim 1, further comprising a storage medium storing a first instruction set associated with the first area, wherein the processor analyzes the first audio signal to obtain the control signal according to the first instruction set when the processor processes the first audio signal.

3. The audio-video control system according to claim 1, wherein the processor further controls the first audio-video player to play an audio test signal in a test mode, and the processor controls the first audio sensor by a controller to receive an audio correction signal, the processor obtains a time difference based on the audio test signal and the audio correction signal, and the processor further performs the noise suppression process for the first audio signal based on the time difference when the processor performs the noise suppression process for the first audio signal according to the audio playing signal for obtaining the third audio signal.

4. The audio-video control system according to claim 1, wherein the processor further controls the first audio-video player to play an audio test signal in a test mode, and the processor controls the first audio sensor by a controller to receive an audio correction signal, the processor obtains a loudness correction model according to the audio test signal and the audio correction signal, and the processor further performs the noise suppression process for the first audio signal based on the loudness correction model when the processor performs the noise suppression process for the first audio signal according to the audio playing signal for obtaining the third audio signal.

5. The audio-video control system according to claim 2, wherein the processor further obtains an audio playing signal from the first audio-video player, and the processor performs a noise suppression process for the first audio signal according to the audio playing signal so as to obtain a third audio signal, and the processor processes the third audio signal for obtaining the control signal.

6. The audio-video control system according to claim 5, wherein the processor further controls the first audio-video player to play an audio test signal in a test mode, and the processor controls the first audio sensor by a controller to receive an audio correction signal, the processor obtains a time difference based on the audio test signal and the audio correction signal, and the processor further performs the noise suppression process for the first audio signal based on the time difference when the processor performs the noise suppression process for the first audio signal according to the audio playing signal for obtaining the third audio signal.

7. The audio-video control system according to claim 5, wherein the processor further controls the first audio-video player to play an audio test signal in a test mode, and the processor controls the first audio sensor by a controller to receive an audio correction signal, the processor obtains a loudness correction model according to the audio test signal and the audio correction signal, and the processor further performs the noise suppression process for the first audio signal based on the loudness correction model when the processor performs the noise suppression process for the first audio signal according to the audio playing signal for obtaining the third audio signal.

8. The audio-video control system according to claim 1, wherein the processor obtains the control signal further according to a time information.

* * * * *